Patented July 20, 1937

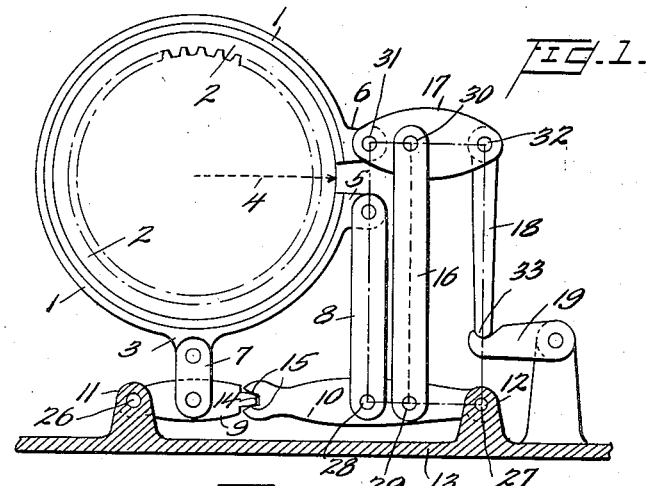
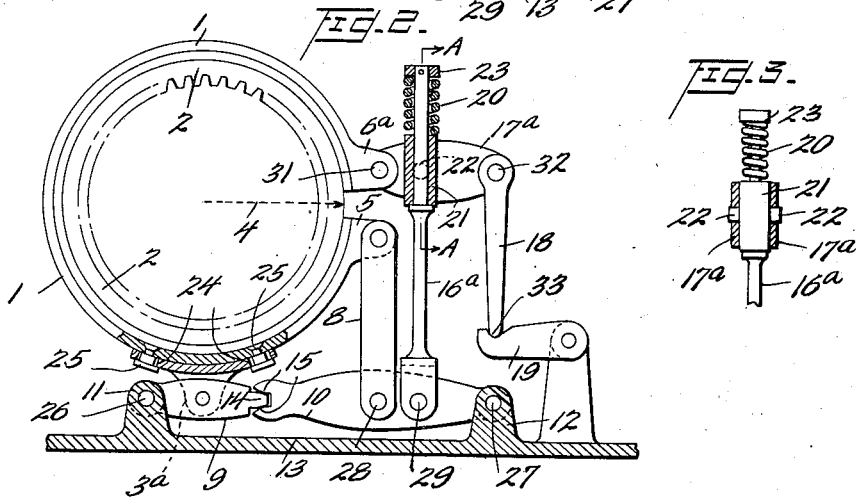
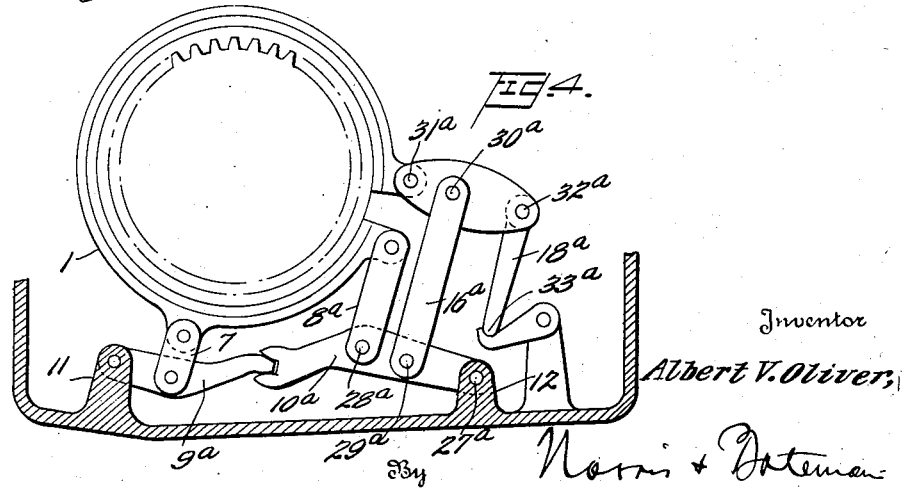

2,087,810

UNITED STATES PATENT OFFICE 2,087,810

BRAKE MECHANISM

Albert Vere Oliver, Coventry, England, assignor to The Daimler Company Limited, Coventry, England, a British company Application May 26, 1936, Serial No. 81,949
In Great Britain May 29, 1935

10 Claims. (Cl. 188—77)

This invention relates to the actuation of brake bands such for example as employed in planetary change-speed gearing, wherein each train of gears consists of a sun pinion in constant mesh with its planet pinion, which in turn are in constant mesh with their annulus, and wherein a change of gear is obtained by braking a reaction drum associated with an element of the selected gear train. The invention refers more particularly to the kind wherein the brake band which encircles the whole or nearly the whole of the circumference of the brake drum is connected to an anchorage at two separate points spaced around the band by a balance device, which prevents the said two points from moving in opposite senses transversely to the line joining them, but does not restrain said points from moving in the same sense in any direction, and wherein the brake applying means comprises a linkage so constructed that a force applied in one direction to a part of the linkage will be imparted to equal extents but in opposite directions to the two ends of the brake bands.

The present invention consists in the provision and use, in combination with brake actuating mechanism of the aforesaid kind, of mechanism for closing the ends of the brake bands, wherein certain links and levers of the said mechanisms are common to both devices.

I will now describe my invention by way of example in connection with the accompanying drawing, in which:—

Figure 1 is a diagram illustrating means according to this invention for closing the ends of an external brake band surrounding one of the brake drums of an epicyclic gearing.

Figure 2 is a similar view of a modified construction.

Figure 3 shows a longitudinal sectional view taken on line A—A, Figure 2.

Figure 4 is a view of a further form of the invention.

Referring to the construction and arrangement shown in Figure 1 the flexible brake band 1 which encircles practically the whole of the brake drum 2 is provided with a lug 3 disposed at right angles to the radius 4 passing midway between the free ends 5 and 6 of the band 1, which are also provided with lugs for attachment to the linkage, as hereinafter described. To the lug 3 on the brake band 1 and the lug 5 on the adjacent free end of the brake band are pivoted links 7 and 8, the said links being disposed in parallel relation, and the end of each link remote from its connection to the brake band 1 is pivotally connected to balance levers 9 and 10. The outer ends of the balance levers 9 and 10 are pivoted at 26 and 27 respectively to fixed anchorages comprising lugs 11 and 12 on the casing 13 of the gear box, the said levers being disposed in a line parallel to the radius 4 passing midway between the free ends of the brake band 1, and the inner ends of the said balance levers are connected together so that they are constrained to swing in opposite senses by means such as gear teeth. In the arrangement illustrated, the lever 9 has formed on the end thereof a single gear tooth 14 arranged to mesh with two teeth 15 on the end of the lever 10.

The balance lever 10 which is connected by the link 8 and the pivot 28 to the one free end 5 of the brake band 1 is connected by a second link 16 and pivots 29 and 30 to a lever 17 pivoted at 31 to the other free end 6 of the brake band 1, and to the outer end of the said lever 17 at 32 may be pivoted a strut 18 adapted to be moved by any convenient form of pre-selector mechanism into a position for engagement at its pivot point 33 by a bus bar 19, arranged to operate in known manner for applying the brake, or, in an alternative arrangement, the said lever may be pivoted to a link connected to an actuating arm adapted to be rocked by any suitable means for exerting a brake applying effort.

It is important, according to the features of this invention, that the force transmitted through the strut 18, or in an alternative arrangement, through a link operated by any suitable means, be arranged so that when the mechanism is moved to its operative position the said force is through a line passing through the centre of the pivot connection 32 of said strut or link to the lever 17, and through the centre of the pivot connection 27 of the balance lever 10 to its fixed anchorage 12, and that such line assumes a substantially parallel position with lines passing through the pivot connections 29 and 30 and 28 and 31 respectively, and that the pivot connections 30, 31 and 32 on the operating lever 17 and 27, 28 and 29 on the balance lever 10, be so arranged and disposed in substantially parallel relation, that lines passing through their centres in two different planes form a parallelogram, in order to obtain a balance of the forces. In Figure 1 the mechanism is shown in its operative position with the brake "on", in which position the strut 18, and the links 8 and 16 assume an approximately parallel relation, so that lines passing through the pivot centers 27, 28, 31 and 32 in four different planes, as shown by the dot and dash lines, form a parallelogram. In the aforesaid position there will be no load on the brake band 1 at right angles to said links and strut. It will be readily understood that any slight angle out of parallel between said links only produces a very slight load at right angles, which is in the order of the force multiplied by the sine of the angle. For example if the force is 500 lbs. and the angle out of parallel is 2 degrees, then the load at right angles would equal 500×.034=17 lbs. It will be noted that the pivot centers 29 and 30 of the link 16, as indicated by the dotted line, lie in a plane parallel to said parallelogram with respect to one dimension thereof, and lie on lines of said parallelogram with respect to the other dimension thereof.

Although in the diagrammatic arrangement illustrated, the pivot connections of the links 8 and 16, and the strut 18 are shown disposed in vertical and horizontal parallel relation, it will be readily understood and appreciated that such may be disposed in any angular relation arranged to permit of the pivot centres assuming a substantially parallel relation in two planes when the forces are applied and the mechanism assumes its operative position. A structure of this character is shown in Fig. 4 and is hereinafter described in detail.

In a modified arrangement, as illustrated in Figures 2 and 3, the aforesaid second link 16a which connects by means of the lever 17a the free end 6a of the brake band 1 to the balance lever 10, is made extensible against a spring 20, so that for a given torque on the bus bar 19, the load of the brake band is definitely limited by the spring 20. In the construction illustrated, the link 16a is slidably mounted in a sleeve 21 connected to the link 17a by trunnions 22, and between the said sleeve and a collar 23 fixed to the upper end of the said link 17a is interposed the spring 20. The link 7 instead of being pivoted to the brake band 1, as shown in Figure 1, may be attached thereto in a manner adapted to permit of a slight circumferential floating movement, which as seen in Figure 2 is effected by forming in the base part of the lug 3a elongated slots 24 engaged by the rivets 25. This arrangement provides for a more compact construction, and obviates the objection of large angular movement associated with the use of a short link such as shown in Figure 1. It is well known that the higher gears need a lighter load on the bus bar than the bottom or reverse gears to apply the brake for holding their reaction drums, therefore it will be appreciated that the use of a spring as aforesaid is adapted to permit of a sufficient load on the bus bar to hold the brake drum of the bottom and reverse gears, and to limit the load when applied to the higher gears.

In a further modified arrangement, the load of the brake band 1 in relation to the load on the bus bar 19, may be varied or controlled in respect of the various gears by varying the pivot connection of the link 16 to the lever 17 and the balance lever 10. For instance, the upper and lower ends may be located closer to, or further away from the pivotal connection of link 8 with brake band 1 and lever 10 respectively so as to vary the mechanical advantage of the system as may be desired in the particular installation involved and the parallel relationship of the parts is preferably maintained.

It will be readily understood that in an epicyclic gear box having any desired number of groups of gear trains in which the reaction drum of an element of each gear train is provided with brake actuating mechanism as aforesaid, when arranged for use in conjunction with pre-selector mechanism, by conditioning or moving the strut of the brake mechanism of the selected gear to a position for engagement with the bus bar, so that when the latter is depressed by such means as a clutch pedal or the like, the strut of the gear last in operation is released from its engagement with the bus bar, and in return movement of the latter, under the action of a spring, or by any power means, the brake of the selected gear will be applied, and the said gear made operative.

It will also be appreciated that the links and balance mechanism are adapted in known manner to cause no lateral stress on the brake drum, and that the balance linkage for applying the brake, being free to move laterally, does not transmit any side stress to the brake drum.

In Fig. 4 I have illustrated a slightly modified form of the invention wherein links 8a and 16a are disposed in parallel relationship and the pivot points 32a and 33a of strut 18a are disposed in alignment with pivot 27a and also the links are disposed normal to a line passing through the pivot connections 28a and 29a of the links with lever 10a and a line passing through the pivot connection 30a of link 16a with lever 17a and the pivot connection 31a of lever 17a with band 1. However balance levers 9a and 10a are so shaped as to permit the mechanism to be installed in a more compact space. This mechanism functions in precisely the same manner as the forms of the invention previously described. An inspection of Fig. 4 will show that the parallelogram of forces therein is the same as in Fig. 1.

What I claim is:—

1. In a brake mechanism, a brake drum mounted for rotation about a fixed axis, a brake band substantially completely encircling said drum and adapted to frictionally cooperate therewith, a support, a pair of levers pivotally connected to said support at different points of said support in proximity to said drum, means for causing said levers to rock in different directions but in synchrony about their pivots, flexible means connecting one of said levers to said brake band at a point remote from the ends thereof, an actuating lever pivotally connected to one end of said brake band, a primary balance link pivotally interconnecting the intermediate portion of said actuating lever and said other lever, a secondary balance link pivotally interconnecting the other end of said band and said other lever, and means for rocking said actuating lever, for causing said balance links and said levers to draw said brake band into intimate engagement with said brake drum.

2. The brake mechanism described in claim 1, wherein said flexible means comprises a link element pivoted at one end to said brake band and at the other end to said one lever, whereby said brake band may rock a predetermined distance about its axis with respect to said one lever.

3. The brake mechanism described in claim 1, wherein said flexible means comprises a bracket pivoted to said one lever and connected to said brake band by means providing lost motion between it and the brake band so as to allow said brake band to undergo rocking movements independently of said bracket.

4. The brake mechanism described in claim 1, wherein said primary balance link is connected to said actuating lever by means of a resilient coupling, to thereby limit the stress built up in the latter and to predetermine the maximum braking effort that may be applied to said brake drum.

5. The brake mechanism described in claim 1, wherein said flexible means is connected to said brake band at a point approximately ninety degrees from the ends of said brake band.

6. In a brake mechanism, a brake drum, a brake band encircling said drum and having its ends disposed adjacent each other, a support, an actuating lever pivoted to one end of said brake band, and adapted to be rocked to actuate said brake band, a balance lever pivotally connected to said support adjacent said drum, a primary link pivotally interconnecting said levers, a second link connected to the other end of said brake band and said balance lever, whereby rocking said actuating lever will rock said balance lever and contract said brake band about said drum, and force translating means for said balance lever to apply brake band engaging forces to a portion of said band remote from the ends thereof when it is rocked in the brake applying direction.

7. The brake mechanism described in claim 6, wherein said force translating means comprises a second balance lever pivoted to said support and connected to said first balance lever for synchronous movement therewith, said second balance lever being connected to said brake band by lost motion means.

8. The brake mechanism described in claim 6, wherein said primary and secondary links are disposed in substantially parallel relationship and are normally substantially perpendicular to a line passing through the points of connection of said links to said balance lever, and to a line passing through the point of connection of said primary link and said actuating lever and the point of connection of the latter to said brake band.

9. The brake mechanism described in claim 6, wherein a sleeve is pivoted to said actuating lever and said primary link is slidably disposed in said sleeve, together with a spring acting against said link and said sleeve.

10. The brake mechanism described in claim 6, including a member pivotally connected to said actuating lever, and means for exerting a brake applying force to said member in a plane passing through the center of the pivotal connection of said member to said actuating lever and through the center of the pivotal connection of said balance lever to said support.

ALBERT VERE OLIVER.